US 6,665,124 B2

(12) United States Patent
Weckstrom

(10) Patent No.: US 6,665,124 B2
(45) Date of Patent: Dec. 16, 2003

(54) GEOMETRICAL BEAM SPLITTER AND A SENSOR FOR MULTI-ELEMENT DETECTORS

(75) Inventor: Kurt Weckstrom, Espoo (FI)

(73) Assignee: Instrumentarium Corp., Helsinki (FI)

( * ) Notice: Subject to any disclaimer, the term of this patent is extended or adjusted under 35 U.S.C. 154(b) by 0 days.

(21) Appl. No.: 10/218,883

(22) Filed: Aug. 14, 2002

(65) Prior Publication Data

US 2003/0043469 A1 Mar. 6, 2003

(30) Foreign Application Priority Data

Aug. 30, 2001 (EP) .......................................... 01660154

(51) Int. Cl.$^7$ .............................................. G02B 27/12
(52) U.S. Cl. ...................... 359/639; 359/618; 359/629; 359/636; 359/583
(58) Field of Search ................................ 359/618, 629, 359/636, 638, 639, 583, 589, 722; 250/203.2, 494.1

(56) References Cited

U.S. PATENT DOCUMENTS

| | | | |
|---|---|---|---|
| 1,253,138 A | 1/1918 | Brewster | 359/636 |
| 2,479,309 A | 8/1949 | Cave-Browne-Cave | 250/201.1 |
| 4,536,090 A | 8/1985 | Schmidt et al. | 356/414 |
| 4,940,309 A | 7/1990 | Baum | 359/618 |
| 5,041,735 A * | 8/1991 | Chang et al. | 250/495.1 |
| 5,367,399 A * | 11/1994 | Kramer | 359/206 |
| 5,610,400 A | 3/1997 | Weckström | 250/345 |
| 5,631,774 A * | 5/1997 | Yoshizawa | 359/640 |
| 5,908,789 A | 6/1999 | Weckström | 436/133 |
| 5,942,755 A | 8/1999 | Dreyer | 250/339.13 |
| 6,046,814 A | 4/2000 | Karlsson et al. | 356/437 |
| 6,122,106 A | 9/2000 | Noyes et al. | 359/618 |
| 6,282,028 B1 * | 8/2001 | Waibel et al. | 359/618 |

FOREIGN PATENT DOCUMENTS

EP  635745  1/1995

OTHER PUBLICATIONS

Patent Abstracts of Japan, vol. 12, No. 348, Sep. 19, 1998 & JP 63 107082 (Mitsubishi Electric Corp.) May 12, 1988.
Patent Abstracts of Japan, vol. 17, No. 654, Dec. 3, 1993 & JP 05 215683 (Fuji Electric Co. Ltd.), Aug. 24, 1993.
Patent Abstracts of Japan, vol. 17, No. 654, Mar. 13, 1993 & JP 05 215684 (Fuji Electric Co. Ltd.), Aug. 24, 1993.
Naumann/Schröder: Bauelemente Der Optik Taschenbuch der Technische Optik; Carl Hanser Verlag 1987, pp. 186–187.
W. Driscoll, W. Vaugham: Handbook of Optics, McGraw–Hill Book Company 1978, pp. 8–106–8–109.
Module 6–6", Filters and Beam Splitters, center of Occupational Research and Development, 1987.

* cited by examiner

*Primary Examiner*—Ricky Mack
*Assistant Examiner*—Brandi N Thomas
(74) *Attorney, Agent, or Firm*—Andrus, Sceales, Starke & Sawall, LLP

(57) ABSTRACT

The invention relates to a geometrical beam splitter, e.g. in a sensor, for transversally dividing a radiation beam (4) into at least one reflected beam portion (5$_R$) and at least one passing beam portion (5$_T$). The beam splitter (1) is composed of a piece (11) of rigid material having a non-transparent reflective surface (3) at an angle ($\alpha$) deviating from the right angle in respect to the incident direction (R$_I$) of said radiation beam. The beam splitter has a width (W) and a height (H) extending over a total effective cross-sectional area (A*) of the radiation beam (4) and e.g. two holes (2a, 2b) extending through said piece of rigid material. The holes allow passing of at least two beam portions (5$_T$), and simultaneously the non-transparent reflective surface divert at least one reflected beam portion (5$_R$) so that said beam portions have substantially similar wavelength distributions.

36 Claims, 2 Drawing Sheets

GEOMETRICAL BEAM SPLITTER AND A SENSOR FOR MULTI-ELEMENT DETECTORS

CROSS REFERENCE TO RELATED APPLICATION

The present application claims priority from European Patent Application No. 01660154.4, filed Aug. 30, 2001.

BACKGROUND AND SUMMARY OF THE INVENTION

The invention relates to a geometrical beam splitter for transversally dividing a radiation beam into at least one reflected beam portion and at least one passing beam portion, said beam splitter being composed of a piece of rigid material having a non-transparent reflective surface at an angle in respect to the incident direction of said radiation beam, said angle substantially deviating from the right angle. The invention also relates to a sensor comprising a radiation source, a measuring chamber, at least two detectors, at least two optical filters each of which between the radiation source and one of the detectors, and a beam splitter composed of a piece of rigid material and being at least partly reflective; whereupon a radiation beam from said radiation source travels to said at least two detectors through the measuring chamber and through the respective optical filters, said beam splitter positioned between the detectors and the measuring chamber so as to allow a reflected portion and an undiverted portion of said radiation beam to reach the detectors simultaneously.

Beam splitters are used in optics for the purpose of combining two beams, and for separating one beam into two. Wavelength region or distribution and intensity ratio between the two separated beam portions depends upon the specific properties of the beam splitter. The most typical beam splitter is a thin plate of glass or plastic with one surface coated with a semi-reflecting coating or semi-transparent mirror coating. One portion of the beam is transmitted through the beam splitter and the other portion is reflected typically by 90 degrees. Possible absorption in the beam splitter materials is here ignored. The drawbacks caused by the reflection from the second glass surface can be avoided by using a beam splitter cube. It consists of two right angle prisms cemented together. The hypotenuse of one prism is coated with a semi-reflecting coating before cementing. The construction is expensive, especially if the wavelengths in use are in the infrared region with few suitable materials. Other type of prisms and combination of prisms are also known. Further a thin semi-reflecting membrane, a pellicle, is a possible solution but it may not be robust enough in many cases and it can be sensitive to temperature fluctuations, and its reliable fastening is also a problem. The beam splitters described above are called physical beam splitters because the complete beam aperture is available in both the transmitted and the reflected part. Physical beam splitters are described e.g. in publication Naumann/Schröder: BAUELEMENTE DER OPTIK Taschenbuch der Technische Optik; Carl Hanser Verlag 1987, pp. 186–187, and the use of a beam splitter can be found in the publication U.S. Pat. No. 5,908,789.

Another alternative of the beam splitters are so called geometrical beam splitters, in which the beam cross-section is either divided into two portions having different wavelength distribution by using a grating or metallic grid or a mesh, or divided into two portions with the same wavelength distribution both having a smaller cross-section area than the initial beam by using reflecting stripes or spots e.g. on a glass plate or a prism or by using a mirror to cover a section of the initial beam. The latter type of beam splitters are often used in the infrared region, but avoiding radiation absorption of the material requires use of special materials, which may cause problems in some applications, because the material has to be thin and a robust support with little temperature dependence is also in this case very difficult to construct. The gratings, grids and meshes are described in publication W. Driscoll, W. Vaugham: HANDBOOK OF OPTICS, McGraw-Hill Book Company 1978, pp. 8-106–8-109 do not suffer radiation absorption problems, but the feature that the transmitting portion and the diverted portion has different wavelength distributions is not acceptable for many purposes. The geometrical beam splitters for cross-sectional dividing are disclosed in publications Naumann/Schröder: BAUELEMENTE DER OPTIK Taschenbuch der Technische Optik; Carl Hanser Verlag 1987, pp. 186–187, and Module 6—6 "FILTERS AND BEAM SPLITTERS", Center of Occupational Research and Development, 1987 {http://www.cord.org/cm/leot/course06}. FIG. 29 in the last mentioned publication shows a planar mirror with an aperture, the mirror being perpendicular to the radiation direction. This kind of mirror construction is used solely in high power $CO_2$-lasers, in which semitransparent mirrors cannot be used because of the extremely high power of several kW's requiring cooling. In these $CO_2$-lasers, utilized for welding and cutting metals, said mirror with aperture is used as one of the end mirrors, whereupon the main portion of the light is reflected directly back to the other mirror at the opposite end of the laser, and the productive laser power beam comes out through the aperture. FIG. 28 in the last mentioned publication shows a plant mirror partly protruding in the incident light beam and so dividing it into one smaller portion of reflected light and one larger portion of undiverted light. This alternative has the drawback not being robust or steady and it is also difficult to manufacture in small sizes with a precision high enough especially for modern sensors with several detectors.

Publications JP-05-215 683 discloses a device for analyzing e.g. the concentrations of gas components in a gas mixture on the basis of the absorption of infrared radiation. The device comprises a radiation source, the radiation emitted thereby being aligned to travel through a measuring cell, which contains the gas mixture to be analyzed, a first optical filter, which is positioned on the path of radiation, and a first detector, positioned in the radiating direction downstream of said first filter and used for detecting the radiation intensity falling thereon. The device further includes at least a second optical filter provided with a detector for identifying and/or measuring the concentration of at least one other gas component. In order that these at least two separate detectors simultaneously receive radiation from the measuring cell, the device is further provided with a beam splitter. According to the publication the beam splitter can be of the type of the semi-reflecting coating or semi-transparent mirror coating, as described above. Alternatively this publication suggests using a reflecting mirror, in the center of which an aperture is punched for passing a portion of the incoming radiation and followed by a gas filter and a detector. Also JP-05-215684 discloses a gas analyzer with a plurality of detectors. However, the beam splitter is composed only of reflecting parts. No transmitted portion of the beam is shown or described.

The publication U.S. Pat. No. 6,122,106 describes an opto-mechanical system to be used as a laser transmitter/receiver for measuring distances. The incoming light is actually not divided into a reflected and a passing beam portion but there is only a reflected portion. The two holes in the mirror are used for transmitting radiation in the opposite direction as compared to the incoming and reflected light. According to the publication these two holes are as small as possible, like "pencil thin", so that the reflected portion is maximized, whereupon the area of the radiation transmitting in inverse direction is extremely small as compared to the area of the reflected radiation. The publication JP-63-107082 describes a laser mirror. It has one or a plurality of very small holes like pinholes in it, whereupon the reflective area is many orders larger than the area of the small holes. The laser light transmitted through this/these small hole(s) forms accordingly an extremely small portion of the whole radiation, which indeed is enough in this case, because the transmitted portion is directed to one detector, which is used for controlling the laser oscillator only. Copper and molybdenum is suggested as the body material and gold is used as a reflective coating.

Publication U.S. Pat. No. 4,940,309 describes a device that divides or brakes down an incoming wavefront into several non-overlapping portions, i.e. into image subsections, and the device is a scanner called "tesselator" The idea is to make a large imaging surface using a plurality of small imaging surfaces. The publication suggest using one or several glass plate(s) with reflective areas of back-coated mirror, the plate(s) protruding into the area of the whole wavefront. It is so preferred that the material of the dividing components is transparent to radiation, and this transparent material has areas of metallic coating, which structure promotes avoiding distortion. Accordingly each detector is here arranged to receive radiation from separate parts of the object.

U.S. Pat. No. 1,253,138 and EP-0 635 745 disclose in principle similar light splitting devices, the U.S.-patent for color photography and the EP-patent application for measuring purposes in ultraviolet region. Both publications suggest using a mirror as thin as possible, whereupon EP-publication defines that the material of the mirror is foil having thickness less than 0.0762 mm, and the mirror has preferably a plurality of holes. Since the beam splitter of the U.S.-patent is part of an imaging device, it is especially important that the holes in the mirror are small and numerous, as disclosed in the publication. Both publications suggest that the walls of the holes are inclined or overcut in order to avoid reflections or scattering from them, and U.S.-patent further says that the walls are made "dead black". This is understandable since such reflections would e.g. blur the image on the photographic plate. These are typical geometrical beam splitters. The wavefront is divided into two more or less identical portions by the many holes in the beam splitter. The detector or film for the transmitted portion and the detector or film for the reflected portion get information from the whole wavefront, which means that each point of e.g. a photographic plate receives radiation from every hole present in the perforated mirror. Both of these publications disclose one single detector/film for the transmitted radiation and one single detector/film for the reflected portion.

In non-dispersive multi-gas detection several detector elements with respective optical filters having narrow passbands of wavelengths are used to identify and measure the concentration of the different infrared absorbing gas components. When using discrete detector packages a robust construction is possible but the size of the sensor is a limiting factor with today's demand for compact measuring devices. One possibility is to integrate all detector elements and optical filters into one package. It is possible to install even more than five detector elements within such a package. However, in order to have all detector elements directed approximately at the same part of the gas sample, the individual elements and optical filters have to be very small. This means reduced signal and less measurement reliability. Potentially lower yield may even suggest that the detector package is expensive to manufacture because of the many small optical filters and crosstalk suppression constructions. A better solution would be to mount the detector elements in two packages and to use a known physical beam splitter, i.e. a semitransparent mirror. Then the detector elements and filters can be larger, because the same package cross-section has fewer elements. The drawback in this case is the intensity reduction introduced by the conventional beam splitter with the typical splitting ratio 50%–50%, meaning that the intensity of the transmitted beam is equal to that of the reflected beam. This is valid independently of how the detector package is positioned in respect to the optical axis.

BRIEF DESCRIPTION OF THE INVENTION

The main object of the present invention is to overcome the described drawbacks and to provide an inexpensive and robust beam splitter to be used with at least two detector packages in different positions. Preferably at least one of the detector packages is of multi-element type. The second object of the present invention is to provide a small sized or miniature sized beam splitter. The third object of the invention is to provide a beam splitter, which allows directing the detectors to measure the same area or volume in a measuring chamber. The fourth object of the invention is to provide a beam splitter, which is without problems applicable to be used with infrared radiation, too. The fifth object of the invention is to provide a beam splitter which divides the incoming radiation beam into portions having at least near identical wavelength range and at least near identical radiation intensity going to the detector packages or detectors prior to optical filters. The sixth object of the invention is to provide a beam splitter, which delivers radiation to each of the detectors with a minimum of losses, i.e. with a high efficiency. Further it is an object of the invention to provide a sensor with a beam splitter, which would be capable for analyzing with high accuracy and reliability several gas components in a gas mixture, without movable parts and with properties as set forth above.

The above-mentioned problems can be solved and the above-defined object can be generally achieved by means of a geometrical beam splitter according to the invention as defined in claim 1, especially in analyzing gas components in a gas mixture by means of a sensor with a geometrical beam splitter according to the invention as defined in claim 16. The principal idea for attaining this kind of a beam splitter is to construct the beam splitter surface with one hole for each detector element of the first package in the transmitted beam and by adjusting the second detector package within the optical confinement of the larger package to receive the reflected beam. By doing this it is possible to increase the computational beam splitting ratio even beyond 90%–90%. The beam splitter gain, i.e. the radiation directed to the detectors, is so approaching 100% as compared to the intensity of the initial radiation coming from the measuring chamber or any other source. This seemingly impossible ratio means that the beam splitter does not necessarily introduce any notable intensity losses. Ideally, these two portions are more or less identical regarding spatial distribution. In this invention the beam splitter is achromatic, which means that it is essentially independent of the wavelength region in use and that there is minimal influence on the beam polarization.

The hole or holes in the geometrical beam splitter according to the invention is/are typically of the same size as or slightly larger than the individual detector elements to allow collimated or nearly collimated radiation to pass through into one or several first detector elements e.g. in the first package. The areas that reflect collimated or nearly collimated radiation to one or several second detector elements e.g. in the second package are proximate to the holes. The total area of the geometrical beam splitter according to inventions preferably extends over the cross-section of the initial radiation beam coming into this beam splitter, in which case the beam splitter does not introduce any losses if good reflectivity is assumed. The hole or holes and the reflective area or areas are close to each other so that each of the detectors receive radiation substantially from the same area or volume of the measuring chamber or from the same area or volume of some other source of interest. Because of the few large holes the beam splitter can be much thicker than what is possible in the prior art constructions. This also means that the plate is robust and easy to mount. Thermal bending can be avoided by using a thermally similar material or even the same material as the rest of the sensor body, preferably aluminum. Such a plate is also easy to polish and mount. A further advantage is that the hole(s) can be formed to function as wavetube(s), as described in patent U.S. Pat. No. 5,610,400 of the applicant, because of the thickness and the metallic material of the beam splitter, which further increases the effectiveness of passing radiation. Though the individual reflecting area(s) are substantially of the same size as the cross-section(s) of the hole(s) is the total reflective area—total area minus area of the hole(s)—large contributing an increased effectiveness of reflected radiation. The detector elements are normally fitted with individual optical filters with narrow pass-bands so that each detector element detects radiation within a different wavelength region. These regions are determined by the spectral absorption peaks of the specific gases to be measured. It shall be understood that though the geometrical beam splitter according to the invention is ideal in the sensor for the multi-gas analyzing, it can be a most useful beam splitter for other type of technical applications, too.

BRIEF DESCRIPTION OF THE DRAWINGS

The invention is now described in detail with reference made to the accompanying drawings.

DETAILED DESCRIPTION OF THE INVENTION

Figures 3A, 3B, 3C:
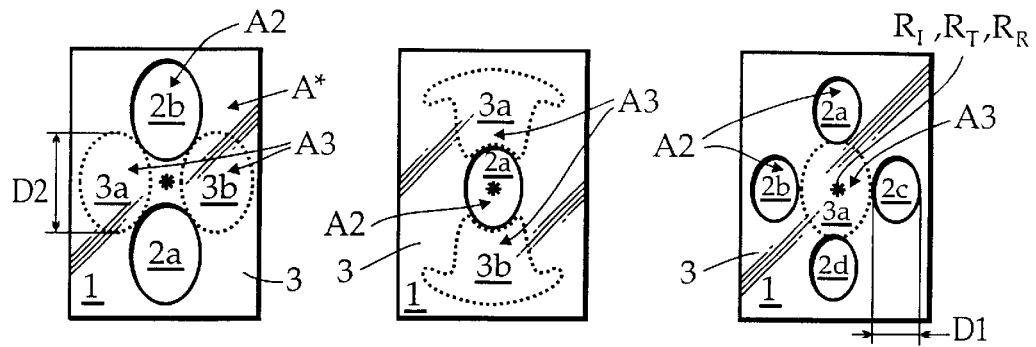
FIGS. 3A–3F illustrate different alternative beam splitter configurations, in which the optical axis of the reflected beam portions coincide on the beam splitter surface with the optical axis of the beam portions passing through the holes. The configuration is seen in the direction perpendicular to the reflective surface.

A geometrical beam splitter divides an initial or incoming radiation beam 4, which has an incident direction $R_I$, transversely into at least one reflected beam portion $5_R$ and at least one passing beam portion $5_T$. The beam splitter 1 is composed of a piece 11 of rigid material having a non-transparent reflective surface 3 at an angle α in respect to the incident direction $R_I$ of said radiation beam, whereupon the angle α substantially deviates from the right angle, i.e. deviates from 90°. Said geometrical beam splitter 1 has a width W and a height H extending over a total effective cross-sectional area A* of the radiation beam 4, and at least one hole 2a or two holes 2a and 2b extending through said piece 11 of rigid material. Effective cross-sectional area A* means the area of that kind of the initial radiation beam 4 or that part of the initial radiation beam 4, which is utilized for detectors or other purposes after one reflection from the reflective surface 3 and after one passing trough the holes 2a, 2b, 2c ..., and which is bordered by the envelope curve touching the outmost points of the holes and the reflective areas 3a, 3b, 3c ... including the oblique rays if needed. The form of the reflective areas is determined by the degree of collimation in the incoming radiation beam 4 as well as the size, form and sensitivity to angle of incidence of the detector or other target in question. In many cases the form of the reflective area is quite complicated, as shown in FIG. 3B. Anyway it is intended that no useful part of the initial radiation is lost by cutting off, but the width W and the height H of the reflective surface are large enough to provide passing and reflected radiation from the relevant part of the measuring chamber or respective object. The rigid material is a material, which is stiff or inflexible enough in order to keep, as self-supporting element or with the aid of attachment means and possible support means, the form and position of the reflective surface with the accuracy required.

Figures 3D, 3E, 3F:
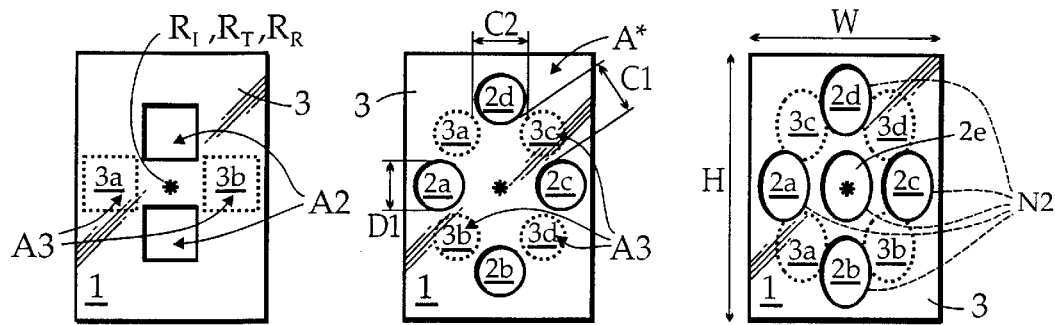
Figures 4A, 4B, 4C:
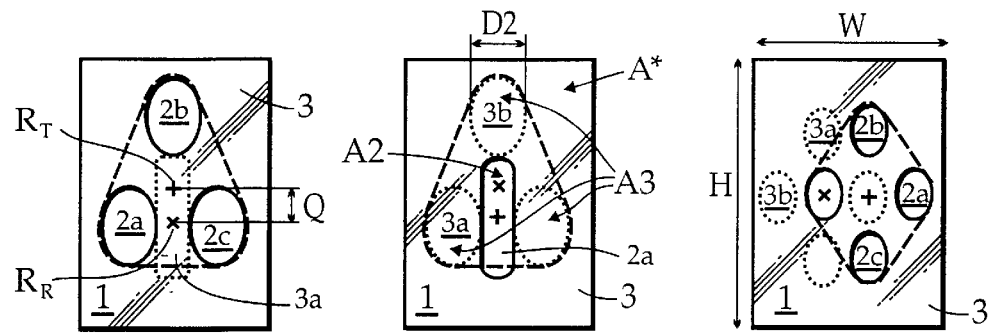
FIGS. 4A–4F illustrate additional special cases of beam splitter configurations, in which the optical axis of the reflected beam portions on the beam splitter surface has spacing as compared to the optical axis of the beam portions passing through the holes. The configuration is seen in the direction perpendicular to the reflective surface.
Figures 4D, 4E, 4F:
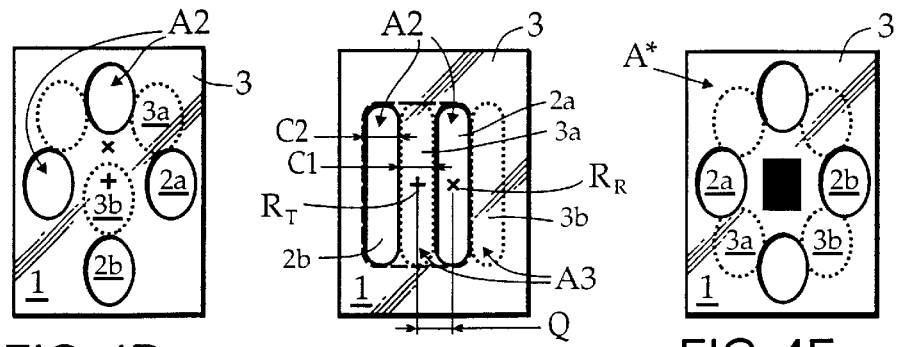

The holes allow passing of at least one beam portions $5_T$ or two beam portions $5_T$ through the beam splitter 1 and simultaneously said non-transparent reflective surface 3 divert at least one reflected beam portion $5_R$ or two reflected beam portions $5_R$ to a reflected direction $R_R$ in accordance with the law of specular reflection. The rays of the passing beam portions $5_T$ from each separate hole 2a, 2b, 2c ... go finally to targets, which are separate or intrinsically independent from each other. Similarly, in case there are two or more reflected beam portions, the rays of these reflected beam portions $5_R$ from each separate reflective areas 3a, 3b, 3c ... go finally to targets, which are separate or intrinsically independent from each other. The final targets of the passing beam portions $5_T$ and final the target(s) of the reflected beam portion(s) $5_R$ are also separate or intrinsically independent from each other. It shall be understood, that the targets can be connected with each other for a later stage without sacrificing their independency, just as signals from separate and independent detectors can be compared or combined. Said angle α has a value typically between 30° and 60°, or preferably a value substantially 45° in respect to the incident direction $R_I$ of said radiation beam. The hole or holes have diameter(s) D1 and distances C2 between the reflective areas, transversal to the length of the hole, and said reflective surface 3 has surface dimensions D2 and distances C1 between said holes, as shown in FIGS. 3E and 4E, each of which are substantially greater than any diameters or surface dimension and distances therebetween affecting a noticeable interference. These large diameters D1 of the holes and the large surface dimensions D2 or distance C1 therebetween prohibit the beams splitter of the invention from functioning like an optical grating or grid, and so both of the beam portions $5_T$, $5_R$ have substantially similar wavelength distributions. The diameters D1 generally means that dimension which is perpendicular to the axis or length L of the holes 2a, 2b, 2c . . . , but in the context of this invention diameters D1 also mean the different dimensions of the holes in the direction of the reflective surface 3, as do the diameters of the reflective areas 3a, 3b, 3c etc. The same applies to the different dimensions of those holes and those reflective areas, which have cross-sectional forms deviating from a circular form or its transformation at angle α.

The non-transparent reflective surface 3 extends as a single, continuous and at least mainly planar surface over the height H and width W of the piece 11. It is possible that polishing the surface may cause a slight deviation from a plane P, especially around the holes, but this kind of minor defects do not make any harm. It is also possible to arrange a small spacing, substantially smaller than the diameters D1 of holes or the surface dimensions D2 of the reflective areas, between any of said holes 2a, 2b, 2c . . . and any of said reflective areas 3a, 3b, 3c . . . of the non-transparent reflective surface 3. This spacing, which is a difference (C2–D1)/2 between a distance C2 from one reflective areas to another and a hole diameter D1 or a difference (C1–D2)/2 between a distance C1 from one hole to another and a reflective area diameter D2, eliminates the rest of the problems concerning local variations in shape of the planar reflective surface 3. Said distances are measured from points where a hole and a reflective area are closest to each other. The geometrical beam splitter 1 can include only one, or two, or three, or several holes 2a, 2b, 2c, 2d etc. in said piece 11 of rigid material and extending therethrough. The hole or holes pass a single, two, three on more individual transmitted or passing beam portions $5_T$ separately from each other through the beam splitter piece 11. Analogously the geometrical beam splitter 1 can also include only one, or two, or three, or several reflective areas 3a, 3b, 3c, 3d etc. side by side, as described later in this text, with the holes, and extending along the specularly reflective surface 3. The reflective areas 3a, 3b, 3c, 3d etc. have a main reflective diameter or respective surface dimension(s) D2, though some radiation is reflected from the reflective surface 3 outside these diameters. About 80% to 90% of the reflected radiation in the reflected beam portion $5_R$ for each reflective area reflects via the respective reflective area 3a, 3b . . . and about 20% to 10% via other areas of the reflective surface 3 as oblique rays. This property promotes the sensitivities of the detectors in reflected beam portion to concentrate into a common area of the measuring chamber. The non-transparent reflective surface 3, and more specifically its reflective areas, divert one, two or more reflected beam portions $5_R$ to the reflected direction $R_R$. Various amounts of holes and reflective areas are shown in FIGS. 3A to 4F. Further the reflective surface 3 has a total reflection area $A_R$ of at least 30% of said total area A*, and said holes has a summed transmission area $A_T$ at least 30% of said total area A*. Here for the total reflection area $A_R=\Sigma A3$, in which A3 means the surface area of any area reflecting a reflected beam portion $5_R$, and for the total transmission area $A_T=\Sigma A2$, in which A2 means the cross-sectional area of any hole guiding a passing beam portion $5_T$. Typically according to the invention one, or two, or several holes 2a, 2b, 2c, 2d etc. in the piece 11 of rigid material and one, or two, or several reflective areas 3a, 3b, 3c, 3d etc. on the reflective surface of said piece 11 of rigid material are arranged circularly alternating with each other, that is in turns at least approximately along a circle as shown in FIGS. 3A to 3F, or linearly alternating with each other, that is shifted in a direction in respect to each other as shown in FIGS. 4A and 4C to 4E. Instead of alternating along a line or a circle the holes and reflective areas can alternate along any other curve. This kind of alternation of holes and reflective areas is valid also in cases where the configurations of holes and reflective areas are different from each other. It shall be also noticed that in a specific beam splitter of the invention not all of the two or more holes and/or not all of the two or more reflective areas is necessarily in use, but they can be potential holes for passing radiation or potential areas for reflecting radiation. Further the holes 2a, 2b, 2c, 2d etc. for the passing beam portions $5_T$ are preferably in contact with or proximate to at least one or preferably two reflective areas 3a, 3b, 3c, 3d etc. for the reflected beam portions $5_R$, which reflective areas are separate with the distance C2 from each other. Analogously the reflective areas 3a, 3b, 3c, 3d etc. for the reflected beam portions $5_R$ are preferably in contact with or proximate to at least one or preferably two holes 2a, 2b, 2c, 2d etc. for the passing beam portions $5_T$, which holes are separate with the distance C1 from each other. Further there is at maximum a spacing, =difference (C2–D1)/2 or difference (C1–D2)/2, between the borders of a reflective area and the neighboring hole and vice versa. Said spacing has a value smaller than 20%, or 10% of the diameters D1 of the holes and/or the surface dimensions D2 of the reflective areas.

Said holes 2a, 2b . . . can have a circular, or an elliptical, or a square, or a rectangular cross-sectional form, as shown in FIGS. 3A to 4F. Said diameters D1 of the holes and said reflective surface dimensions D2 between the holes are deviating 50% at maximum from each other. The cross-sectional form of the holes 2a, 2b, 2c . . . can be identical with the form, like surface dimensions D2 e.g. diameters, of the reflective areas 3a, 3b, 3c . . . , but if needed the holes can have different form as compared to the form of the reflecting areas. It is pointed out that the holes do have distinct cross-sectional form depending on the manufacturing, but the form of the reflective areas is dependent on the radiation directions in the incident radiation beam 4 and on the sensitivity distribution of the detectors or respective components receiving the reflected portions $5_R$, and accordingly do not necessarily have quite definitely limited borders.

Figure 1:
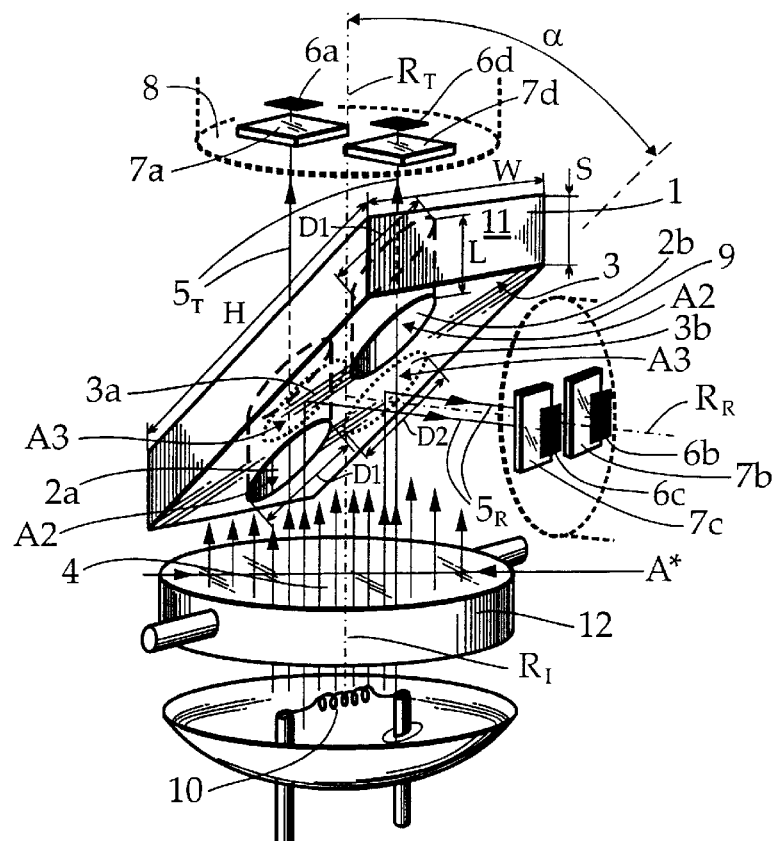
FIG. 1 illustrates generally a sensor with separate geometrical beam splitter according to the invention for analyzing gas mixtures utilizing several detectors, in an axonometric view.
Figure 2:
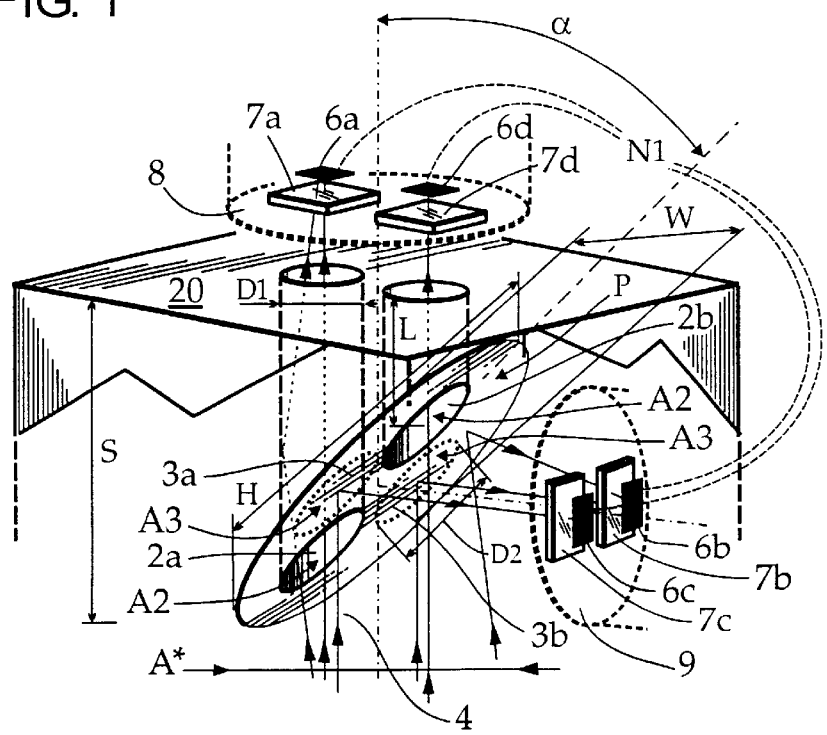
FIG. 2 illustrates another embodiment of the geometrical beam splitter according to the invention, in which the beam splitter is an integrated part of the sensor body.

Said rigid material is preferably made of a metal, like aluminum. The metallic piece 11 of rigid material can be a single plate, as shown in FIG. 1, separate as such from the body of the apparatus in question, but firmly attached to this body by any known or new means not shown in the figures. Alternatively the metallic piece 11 of rigid material can be a continuous part of an apparatus body, as shown in FIG. 2. The piece 11 of rigid material has, according to the invention, a substantial thickness S that is either changing wedge like, as shown in FIG. 2, or substantially constant over the height H of the beam splitter, as shown in FIG. 1. The thickness S is such that it allows preparing hole or holes 2a, 2b, 2c . . . having at least a length L that is equal with the diameter D1 of the holes, whereupon the walls of the holes consist of a metallic material. The length L of the holes is typically the same as the thickness S of the piece 11 of the rigid material of the beam splitter, whether the piece is a separate part from the body of sensor or an integrated part of the sensor body 20. In this way the hole or holes is/are functioning as wavetube(s) for the passing beam portion(s) $5_T$ as described in the patent publication U.S. Pat. No. 5,610,400, according to which the length of the wavetube is at least five times the mean diameter. For the wave-guide purpose the walls of said holes 2a, 2b . . . may be parallel, or converging, or diverging in the longitudinal direction thereof. The holes can be directed to a common area of the measuring chamber 12, whereupon the lengths L of the holes are not parallel. The properties of the wavetubes promotes, also when they are mutually parallel, the sensitivities of the several detectors 6a to 6d etc. to concentrate into a common area or volume of the measuring chamber. It is also possible to enhance this effect by arranging a wavetube, especially a wavetube with walls diverging in respect to each other along the length thereof beginning at the end towards the measuring chamber and ending at the end towards the beam splitter 1, as described in the patent publication U.S. Pat. No. 5,610,400.

A sensor for analyzing gas components in a gas mixture comprises a radiation source 10, a measuring chamber 12, at least two detectors 6a, 6b, at least two optical filters 7a, 7b each of which between the radiation source and one of the detectors. Depending on the type of the detectors, all of the filters or some of them can be left away, e.g. in case the detectors have proper sensitivity range for the purpose in question. This kind of sensor, generally known, is used for different purposes. As earlier in this text mentioned the beam splitters, if used in the construction, compose of a piece of rigid material being some type of the semitransparent mirrors, i.e. at least partly reflective. The radiation beam 4 from the radiation source travels to the detectors through the measuring chamber and through the respective optical filters, if present, and the beam splitter is positioned between the detectors and the measuring chamber, whereupon it allow a reflected portion and an undiverted portion of said radiation beam to reach the detectors simultaneously. According to the invention the beam splitter in the sensor is a geometrical beam splitter 1 as described above. So the non-transparent reflective surface(s) 3 on said piece 11 of rigid material reflects at least two transversal beam portions $5_R$ into at least a second and a third detector 6b, 6c, and further at least one hole 2a extends through said piece 11 passing a transversal beam portion $5_T$ into at least a first detector 6a. The width W and the height H extend over a total effective cross-sectional area A* of the radiation beam 4 necessitated by the detectors 6a, 6b, 6c . . . . The piece 11 has continuous surface dimension or dimensions D2 around said hole or holes, and hole diameter or diameters D1 allowing passing and reflectance with substantially similar wavelength distributions for said beam portions $5_T$, $5_R$ as described above, to avoid interference. In this case the geometrical beam splitter 1 can also comprise two or several holes 2a, 2b, 2c etc. extending through said piece of rigid material, whereupon the second hole 2b and possible further holes pass another and third etc., i.e. several transversal beam portions $5_T$ into a fourth detector 6d or possible further detectors, i.e. into the respective ones of several detectors 6a, 6d, 6f . . . . The number N1 of detectors 6a, 6b, 6c, 6d . . . is greater than the number N2 of the holes 2a, 2b, 2c . . . . The second detectors 6b, 6c etc. for the reflected beam portions $5_R$ are in a configuration transversal to the optical axis $R_R$ of said reflected beam portions, and the first detectors 6a, 6d etc. for the passing beam portions $5_T$ are in a configuration transversal to the optical axis $R_T$ of said passing beam portions. The detectors 6a, 6d etc. for the passing beam portions $5_T$ leaving the separate holes 2a, 2b etc. are also separate and intrinsically independent from each other, and similarly the detectors 6b, 6c etc. for the reflected beam portions $5_R$ leaving the separate reflective areas 3a, 3b etc. are also separate and intrinsically independent from each other, as is described in the context of targets earlier in this text.

The holes 2a, 2b, 2c . . . in the beam splitter 1 disclosed can be filled with air or with some specific gas or gas mixture depending on the wavelength range in use and the environment, in which the beam splitter is to be used, but the holes can be also filled with a transparent solid material, like glass or quartz or other silicate, or some other amorphous or crystalline material, like calcium fluoride. The compounds for said transparent solid material are typically salts of one or several metals, but the invention shall not be considered to be limited by the definitions. It is also possible to fill the holes with a liquid or a jelly. Further, any other sections of the sensor or the sections prior to and/or after, in the direction of the radiation, the beam splitter 1 can be filled with gaseous or solid material, or with a liquid or jelly, which can be the same material as or a different material than that in the holes.

Preferably the hole(s) 2a, 2b, 2c . . . for attaining the passing beam portion(s) $5_T$ are arranged proximate to or also between those reflective areas 3a, 3b, 3c . . . of said non-transparent reflective surface 3, which reflect the reflected beam portions $5_R$ to the respective one of several detectors 6b, 6c . . . , or vice versa. The hole(s) 2a, 2b, 2c . . . for attaining said passing beam portion(s) $5_T$ form a first pattern, as shown by continuous lines in FIGS. 1 to 4F, and those reflective areas 3a, 3b, 3c . . . of said non-transparent reflective surface 3 for attaining said reflected beam portions $5_R$ form a second pattern, as shown by dashed lines in FIGS. 1 to 4F. The first pattern and the second pattern are arranged to lie within said total area A* of the beam or a part thereof so that any of said hole(s) is not crossing any of said areas. The first pattern can have substantially the same configuration as the second pattern, as shown in FIGS. 1, 2, 3A, 3D, 4C and 4E. In this case the second pattern is shifted in the direction of the reflective surface 3 in respect to the first pattern, or the second pattern is a mirror image of the first pattern, or turned around one of the optical axes $R_T$ and/or $R_R$, and shifted or not shifted in the direction of the reflective surface 3 in respect to the first pattern. Alternatively the first pattern can have a different configuration than the second pattern, as shown in FIGS. 3B, 3C, 4A, 4B, 4D and 4F. The first pattern has a first central point +, defined by the optical axis of passing portions $5_T$, and said second pattern has a second central point ×, defined by the optical axis of reflected portions $5_R$. In many cases it is preferred that the first central point + and said second central point × coincide in a common point * with each other. The first central point + and said second central point × can also have a spacing Q. This spacing Q can be equal with at least some diameter D1 of the hole(s) 2a, 2b . . . or at least some surface dimension D2 of said reflective areas 3a, 3b . . . , or equal with the distance between the centers of the holes and centers of the reflective areas, as shown in FIG. 4C or otherwise dependent on these diameters or distances.

Different configurations for the holes and reflective areas of the beam splitter are shown in FIGS. 3A to 4F and described now in detail. Concerning the detector packages FIGS. 1 and 2 are referred to, whereupon the beam splitter 1 is thought to be replaced by a beam splitter configurations according to FIGS. 3A to 4F. FIGS. 3A–3F and FIG. 4F are symmetrical configurations with respect to the optical axes $R_R$ and $R_T$. FIGS. 1 to 2 illustrates how two dual detector packages 8, 9 could be arranged to give optimal signal to all detector elements 6a to 6d utilizing a beam splitter which comprises the configuration of the reflective surface and holes as shown in FIG. 3A. For configurations of the beam splitters of FIG. 3D and FIG. 3E each detector package contains two and four detector elements, respectively. Since the central part of the beam splitter is largely unused in FIG. 3E an additional hole 2e can be applied for a fifth detector element in the first package 8 as shown in FIG. 3F. In beam splitter of FIG. 3B only one hole 2a is used but the reflected beam is received by a multi-element detector, in this case a dual detector. The situation could also be the opposite like in FIG. 3C. The central part reflects radiation at a single element detector in the second package 9 and the first package 8 contains four detector elements. The detector packages 8 and 9 do not necessarily have to be centered on the optical axes $R_R$ and $R_T$, respectively, even if this is the preferred configuration. A slight shift in a specific direction can sometimes give a more desired result. However, the shift of one detector package must not be more than that the central point of the package in optical sense is within the confinement of the larger detector package in optical sense. FIG. 4A gives an example of this. Three holes with the first central point at + for three detectors in package 8 are used together with a narrow single element detector in package 9 with the second central point at × to give optimal performance. The point at × is within the optical confinement of the package 8 with three detector elements as shown by the dashed line. The same situation is shown in FIG. 4B but with the detector packages reversed. In FIG. 4C two four-element detectors have been combined so that no unused area exists in the central part of the beam splitter like in FIG. 3E. The combined aperture has increased, but can in some cases be allowed. FIG. 4D illustrates a beam splitter where a four-element detector in package 8 and a three-element detector in package 9 are combined so that one element is clearly outside the combination of the six other elements. This can be allowed if the specific detector element measures a gas with little optical relation to the other gases. Carbon dioxide is a good example of this because it has a very distinct absorption region at 4.3 $\mu$m with little interference from other gases. When measuring e.g. anesthetic gases with overlapping absorption regions at about 8.5 $\mu$m it is important that all involved detectors get the information from the same sample volume. This is ensured only when the detector elements are close together as seen from the source. FIG. 4E illustrates how two dual-element detectors could be arranged to get optimum coverage. The optical confinement for the holes is shown as a dashed line and the central point × of the reflected portions is within this area. FIG. 4F illustrates how the central area in FIG. 3E can be used for other purposes. The black area can be a temperature sensor or even a separate detector element mounted in or close to the beam splitter. It could also be a mirror surface directing radiation differently than the mirror surface of the beam splitter or it could be the entrance to a separate light guide. According to the invention, the holes 2a, 2b etc. for the passing beam portions $5_T$ have a substantially similar or identical configuration as the first detectors 6a, 6d etc. in use, in e.g. in the first detector package 8 or packages, and the reflective areas 3a, 3b etc. for the reflected beam portions $5_R$ have a substantially similar or identical configuration as the second detectors 6b, 6c etc. in use, in e.g. in the second detector package 9 or packages. There might be some scale differences between the detector configurations and the configurations of the holes and the reflective areas.

The piece 11 of the rigid material can be a separate plate, secured to the sensor body as disclosed above. Alternatively the 11 of the rigid material can be an integral part of a sensor body, whereupon the reflective surface 3 with its reflective areas 3a, 3b, 3c . . . and the holes 2a, 2b, 2c . . . are machined in the metallic body of the sensor and polished as necessary. Anyway the non-transparent reflective surface 3 is a single plane P having an angle $\alpha$ in respect to the incident radiation beam, so as to divert the reflected portion(s) $5_R$ into a transversal direction. Preferably the reflected portions have a radiation direction, e.g. optical axis $R_R$ thereof, perpendicular or approximately 90°±15°, to the direction $R_I$ of the incident radiation and the radiation direction of the passing radiation, e.g. optical axis $R_T$ thereof.

Said geometrical beam splitter 1 is positioned spatially within said radiation beam 4 transversally—in a direction perpendicular to direction $R_I$ of the incident radiation—in front of a first array 8 of detectors, or detector package 8, and longitudinally—in a direction parallel to direction $R_I$ of the incident radiation—to reflect to a second lateral array of detectors 9 or detector package 9 positioned away from the total cross-sectional area A* of the radiation beam 4. Especially the first pattern formed by the holes 2a, 2b, 2c . . . matches with said first array 8 and is aligned therewith to pass each of the passing beam portions $5_T$ to the respective ones of the individual detectors in the first array or package. In the respective way the second pattern formed by the reflective areas 3a, 3b, 3c . . . of the reflective surface 3 matches with said second array and is aligned therewith to divert each of the reflected beam portions $5_R$ to the respective ones of the individual detectors in the second array or package.

As already described the hole or holes 2a, 2b, 2c . . . has/have length(s) L at least equal with the diameter D1 of the holes, and that the walls of the holes preferably consist of a metallic material, whereupon the hole(s) act(s) as wavetube(s) to control the directions of radiation hitting the optical band-pass filters 7a, 7d. This increases the signal from the respective detector elements and can also offer a possibility to displace disturbing ambient gases. Preferably the walls in each of the hole(s) 2a, 2b, 2c . . . are substantially parallel and polished to form a more effective wavetube(s) for the transversal beam portion(s) $5_T$ passing through the hole(s). It is possible to manufacture the beam splitter from some other material, like glass or a ceramic, too, but it is more complicated. In principle the holes can be diverging or converging, but the manufacturing of such a forms in the size now in question is difficult and expensive. So an extremely robust beam splitter construction with integrated light guides or wavetubes for the transmitted/passing beam portion $5_T$ is attained.

As pointed out earlier the beam splitter in this invention can be thick. If made of a metal plate a thickness of 0.5–1 mm or greater up to 1.5 mm or 2 mm is no problem and makes mounting easier. The beam splitter could in fact be much thicker as illustrated in FIG. 2. The holes are machined, e.g. by drilling or grinding directly in bulk material and can be used as light guides already in their drilled condition, in which the holes have reflectance good enough for most purposes, but the walls can be further polished for still higher reflectance. So, using a simple, e.g. having only one step, and proper manufacturing method it is possible to attain inner surfaces for the holes with quite a high luster or glossiness, especially when the beam splitter is metal, e.g. aluminum. This enhances the signal to the detector elements in package 8 at the output end of the holes because also rays at a slight angle from the collimated direction will hit the detector elements. In practice, the signal level will be about the same as for the reflected rays because the usable reflecting surface actually extends beyond the dotted area in certain directions, thus also allowing for slightly skew rays to hit the detector elements of package 9. If the material of this combined beam splitter and light guide is the same as that of the sensor body the construction is very rigid and thermally stable. It is even possible to machine the beam splitter directly into the sensor body. The beam splitter mirror surface as well as the light guide surfaces can also be coated with a highly reflecting material to enhance performance. Aluminum is quite good in the infrared region but e.g. gold would be still better. The holes 2a and/or 2b and/or 2c etc. or light guides can even be filled with a material that transmits the radiation in use, in order to remove air with its contaminants as disclosed in the patent publication U.S. Pat. No. 6,046,814 of the applicant. As an example it is beneficial to fill the light guide for a detector measuring carbon dioxide with a rod made of sapphire. The longest light guide is best for this purpose so that as much disturbing ambient gas as possible is displaced between the source and the detector element.

What is claimed is:

1. A geometrical beam splitter for transversally dividing a radiation beam into at least one reflected beam portion and at least one passing beam portion, said beam splitter:
   being composed of a piece of rigid material having a non-transparent reflective surface at an angle in respect to the incident direction of said radiation beam, said angle substantially deviating from the right angle; and
   having a width and a height extending over a total effective cross-sectional area of the radiation beam, and at least two holes extending through said piece of rigid material, wherein
      said holes have at least a length that is equal with the diameter of the holes and reflective walls to form radiation guiding wavetubes, whereupon: said holes allow passing of at least two beam portions with radiation from a substantially same object area or volume into separate and independent targets; and simultaneously said non-transparent reflective surface divert at least one reflected beam portion with radiation from said substantially same object area or volume into one or more separate and independent target(s), said beam portions having substantially similar wavelength distributions.

2. A geometrical beam splitter according to claim 1, wherein said non-transparent reflective surface extends at least between said at least two holes; and said reflective surface has a total reflection area at least 30% of said total area, and said holes has a summed transmission area at least 30% of said total area.

3. A geometrical beam splitter according to claim 1, further comprising said two, or three, or several holes in said piece of rigid material and extending therethrough.

4. A geometrical beam splitter according to claim 1, wherein said holes has a circular, or an elliptical, or a square, or a rectangular cross-sectional form.

5. A geometrical beam splitter according to claim 1, wherein said rigid material is a metal.

6. A geometrical beam splitter according to claim 5, wherein said rigid material is a single plate or a continuous part of an apparatus body.

7. A geometrical beam splitter according to claim 6, wherein said piece of rigid material has a substantial thickness which is changing wedge like over the height of the beam splitter.

8. A geometrical beam splitter according to claim 6, wherein said piece of rigid material has a substantial thickness, which is substantially constant over the height of the beam splitter.

9. A geometrical beam splitter according to claim 1, wherein said angle has a value between 30° and 60° in respect to the incident direction of said radiation beam.

10. A geometrical beam splitter according to claim 1, wherein said non-transparent reflective surface is adapted to divert two or more reflected beam portions.

11. A geometrical beam splitter according to claim 1, wherein said non-transparent reflective surface diverting said reflected beam portions is planar.

12. A geometrical beam splitter according to claim 1, wherein said walls of the holes consist of a metallic material.

13. A geometrical beam splitter according to claim 1, wherein the walls of said holes are parallel, or converging, or diverging in the longitudinal direction thereof.

14. A geometrical beam splitter according to claim 1, wherein that said holes have diameters and distances between the reflective areas, and said reflective surface has surface dimensions and distances between said holes, each of which are substantially greater than any diameters or surface dimension and distances therebetween affecting a noticeable interference.

15. A geometrical beam splitter according to claim 14, wherein said diameters of the holes and said surface dimensions between the holes are deviating 50% at maximum from each other.

16. A sensor comprising:
   a radiation source;
   a measuring chamber, and
   a geometrical beam splitter composed of a piece of rigid material, with
      at least one hole extending through said piece of rigid material, said hole passing a transversal beam portion into at least a first detector,
      a non-transparent reflective surface on said piece of rigid material reflecting at least two transversal beam portions into at least a second and a third detector, and
      a width and a height extending over a total effective cross-sectional area of the radiation beam necessitated by the detectors;
   whereupon a radiation beam from said radiation source travels to said at least three detectors through the measuring chamber, said beam splitter positioned between the detectors and the measuring chamber so as to allow a reflected portion and an undiverted portion of said radiation beam to reach the detectors simultaneously, wherein in said beam splitter:
      said at least one hole has/have length(s) at least equal with the diameter of the holes forming wavetube(s) for the transversal beam portion(s) passing through the hole(s); and
      said non-transparent reflective surface has such continuous surface dimensions around said at least one hole, and said hole(s) has/have such diameter(s), which allow reflectance and respectively passing of said beam portions with substantially similar wavelength distributions, concentrating the sensitivies of the detectors to receive radiation substantially from a common area or volume of the measuring chamber.

17. A sensor according to claim 16, wherein said piece of rigid material for the geometrical beam splitter comprises at least two holes extending through said piece of rigid material, said second hole passing another transversal beam portion into a fourth detector.

18. A sensor according to claim 16, wherein said piece of rigid material for the geometrical beam splitter comprises several holes extending through said piece of rigid material, said holes passing several transversal beam portions into the respective ones of several detectors.

19. A sensor according to claims 17, wherein said hole(s) for attaining said passing beam portion(s) are arranged between those reflective areas of said non-transparent reflective surface for attaining said reflected beam portions, or vice versa.

20. A sensor according to claims 17, wherein said hole(s) for attaining said passing beam portion(s) form a first pattern, and those reflective areas of said non-transparent reflective surface for attaining said reflected beam portions form a second pattern; and said first pattern and said second pattern are arranged to lay within said total area of the beam or a part thereof so that any of said hole(s) is not crossing any of said areas.

21. A sensor according to claim 20, wherein said first pattern has substantially the same or different configuration than said second pattern.

22. A sensor according to claim 21, wherein said second pattern is shifted in the direction of the reflective surface in respect to the first pattern, or turned around one of the optical axes, or the second pattern is a mirror image of the first pattern and shifted or not shifted in the direction of the reflective surface is respect to the first pattern.

23. A sensor according to claim 21, wherein said first pattern has a first central point and said second pattern has a second central point, and said first central point and said second central point coincide with each other or have a spacing respective to at least some diameter of the hole(s) or said reflective areas.

24. A sensor according to claim 19, wherein said hole(s) and said reflective areas has a circular, or an elliptical, or a square, or a rectangular configuration at the plane of said non-transparent reflective surface.

25. A sensor according to claim 24, wherein said non-transparent reflective surface is a single plane.

26. A sensor according to claim 16, wherein said rigid material is a metal.

27. A sensor according to claim 16, wherein said rigid material is a separate plate or an integral part of a sensor body.

28. A sensor according to claim 16, wherein said non-transparent reflective surface has an angle in respect to said radiation beam, and said angle substantially deviates from 90°.

29. A sensor according to claim 28, wherein said angle is between 30° and 60°.

30. A sensor according to claim 16, wherein said geometrical beam splitter is positioned spatially within said radiation beam: transversally in front of a first array of detectors and longitudinally to reflect to a second lateral array of detectors.

31. A sensor according to claim 30, wherein said first pattern matches with said first array and is aligned therewith to pass a passing beam portion, and said second pattern matches with said second array and is aligned therewith to divert a reflected beam portion.

32. A sensor according to claim 16, wherein the walls of the holes consist of a metallic material.

33. A sensor according to claim 16, wherein the wall(s) of said hole(s) is/are substantially parallel and reflective to form said wavetube(s).

34. A sensor according to claim 33, wherein the wall(s) of said hole(s) is/are internally lustrous to form said wavetube (s).

35. A sensor according to claim 16, wherein the number of detectors is greater than the number of the holes.

36. A sensor according to claim 16, further comprising at least two optical filters each of which between the radiation source and one of the detectors, whereupon said radiation beam from the radiation source travels to said at least two detectors through the respective optical filters.

* * * * *